(12) United States Patent
Konno et al.

(10) Patent No.: US 8,599,033 B2
(45) Date of Patent: Dec. 3, 2013

(54) INFORMATION PROCESSING DEVICE, INFORMATION NOTIFICATION METHOD AND COMPUTER PROGRAM

(75) Inventors: Akira Konno, Tokyo (JP); Taiki Hori, Tokyo (JP); Eiji Kimura, Kanagawa (JP)

(73) Assignee: Sony Corporation, Tokyo (JP)

(*) Notice: Subject to any disclaimer, the term of this patent is extended or adjusted under 35 U.S.C. 154(b) by 990 days.

(21) Appl. No.: 12/554,298

(22) Filed: Sep. 4, 2009

(65) Prior Publication Data

US 2010/0060473 A1 Mar. 11, 2010

(30) Foreign Application Priority Data

Sep. 5, 2008 (JP) ................................ 2008-227829

(51) Int. Cl.
*G08B 21/00* (2006.01)
(52) U.S. Cl.
USPC .................................. 340/686.1; 340/426.11
(58) Field of Classification Search
USPC .......... 340/686.1, 102, 686, 426.11; 345/173, 345/156, 1, 156.1
See application file for complete search history.

(56) References Cited

U.S. PATENT DOCUMENTS

| | | | | |
|---|---|---|---|---|
| 4,903,222 | A * | 2/1990 | Carter et al. ............. | 361/679.12 |
| 2003/0220721 | A1* | 11/2003 | Cohen ............................ | 700/301 |
| 2004/0217945 | A1* | 11/2004 | Miyamoto et al. ............ | 345/173 |
| 2005/0275626 | A1* | 12/2005 | Mueller et al. ................ | 345/156 |
| 2007/0120834 | A1* | 5/2007 | Boillot ........................... | 345/173 |
| 2008/0165116 | A1* | 7/2008 | Herz et al. ..................... | 345/102 |

FOREIGN PATENT DOCUMENTS

| | | |
|---|---|---|
| JP | 2003-99193 A | 4/2003 |
| JP | 2006-236774 | 9/2006 |
| JP | 2007-133698 A | 5/2007 |
| JP | 2007-206871 A | 8/2007 |
| JP | 2007-249356 A | 9/2007 |
| JP | 2008-15453 A | 1/2008 |
| JP | 2008-41536 A | 2/2008 |
| JP | 2008-92081 A | 4/2008 |

* cited by examiner

*Primary Examiner* — Shirley Lu
(74) *Attorney, Agent, or Firm* — Oblon, Spivak, McClelland, Maier & Neustadt, L.L.P.

(57) ABSTRACT

An information processing device is provided which includes a detection portion that detects an approach or a touch of an operating body and that is provided on an external surface of a housing having a first housing and a second housing that is openably/closably attached to the first housing, a storage portion that stores detection information detected by the detection portion and a blinking pattern, and a blinking control portion that controls blinking of a light emitting portion based on the detection information detected by the detection portion and on the blinking pattern. With this configuration, results of detection by the detection portion can be notified to the user by the light emitting portion.

13 Claims, 14 Drawing Sheets

FIG.10

| EVENT | ILLUMINATION IMAGE |
|---|---|
| TOUCH | "HAPPINESS" LIKE A PET THAT IS CALLED AND HELD |
| LEAVE HAND IN CONTACT | "PEACEFULNESS" LIKE TOUCHING AND CALMING DOWN A PET |
| STROKE | "GREAT JOY" FUN OF PLAYING TOGETHER |

FIG.12

| EVENT | ILLUMINATION IMAGE |
|---|---|
| POWER ON | "LIVELY"<br>AWAKE AND FULL OF ENERGY IMAGE |
| POWER OFF | "MELANCHOLY"<br>LET'S MEET AGAIN TOMORROW |
| OPEN TOP SURFACE PORTION | "EXCITEMENT"<br>FUN OF PLAYING TOGETHER FROM NOW<br>FUN OF OPENING A TREASURE CHEST |
| CLOSE TOP SURFACE PORTION | "SADNESS"<br>IMAGE OF PUTTING AWAY TODAY'S MEMORIES SAFELY |
| INSERT/REMOVE ADAPTOR CARD | "REACTION"<br>TAPPING ON THE SHOULDER, SLIGHT SURPRISE LIKE BEING CALLED BACK AND TURNING ROUND |
| SUSPEND (Sleep) | "CALM"<br>CALM BREATHING OF SLEEP |

INFORMATION PROCESSING DEVICE, INFORMATION NOTIFICATION METHOD AND COMPUTER PROGRAM

BACKGROUND OF THE INVENTION

1. Field of the Invention

The present invention relates to an information processing device, an information notification method and a computer program.

2. Description of the Related Art

Touch sensors are used, for example, in automatic ticket issuing systems for public transport or bank ATMs, photocopier displays and so on, in which information is input by touching the screen with a finger or the like. As well as achieving an intuitively easy to use user interface, such touch sensors also offer a variety of added values, and are therefore being used in recent years in mobile phones, game consoles and so on.

While touch sensors offer the advantages described above, there are some problems. In contrast to mechanical switches, when touch sensors are operated, a user does not obtain a feeling of having depressed anything, and the display contents in the area touched by the finger are not easily visible. In response to such problems, technology is disclosed, for example, in which an LED is provided corresponding to a switch that is a touch sensor, and when the switch is depressed, it causes the corresponding LED to emit light (refer to Japanese Patent Application Publication No. JP-A-2006-236774).

SUMMARY OF THE INVENTION

However, in the invention disclosed in Japanese Patent Application Publication No. JP-A-2006-236774, there is a one-to-one correspondence between switches and LEDs, and an LED detects when a particular switch is depressed and makes a user aware of the detection results by illumination of the LED. With this type of LED as an indicator, states are indicated by the illumination or flashing of a single color, and the meaning of the state indicated by that LED is difficult to understand without reference to a manual or the like. Further, each of the LEDs may be scattered in different positions, and it may be difficult to understand based on which LED the event state should be confirmed.

To address this, the present invention provides a new and improved information processing device, information notification method and computer program that allow a user to easily recognize an operating state.

According to an embodiment of the present invention, there is provided an information processing device including: a detection portion that detects an approach or a touch of an operating body and that is provided on an external surface of a housing having a first housing and second housing that is openably/closably attached to the first housing; a storage portion that stores detection information detected by the detection portion and a blinking pattern; and a blinking control portion that controls blinking of a light emitting portion based on the detection information detected by the detection portion and on the blinking pattern.

According to the present invention, when the approach or touch of the operating body is detected, the blinking control portion causes the light emitting portion to blink based on the detected detection information. In this way, a detection result by the detection portion can be notified to a user by the light emitting portion.

The information processing device can also be provided with an analysis portion that analyzes operation of the operating body from the detection information detected by the detection portion. In this case, the blinking control portion controls blinking of the light emitting portion based on results of analysis by the analysis portion.

Additionally, a storage portion of the information processing device can further store an operation of the operating body that is analyzed by the analysis portion and a blinking pattern. In this case, the analysis portion acquires the blinking pattern associated with the operation of the operating body analyzed by the analysis portion from the storage portion and the blinking control portion causes the light emitting portion to blink in accordance with the blinking pattern acquired from the storage portion.

Further, the information processing device according to the present invention can further include an operation detection portion that detects an operating state of the information processing device. In this case, the blinking control portion may control blinking of the light emitting portion in accordance with the operating state detected by the operation detection portion.

When a plurality of detection information is detected by the detection portion or when a plurality of operating states is detected by the operation detection portion, the blinking control portion can decide a blinking pattern of the light emitting portion based on an order of priority set in advance. Further, when one of a plurality of detection information and a plurality of operating states having a same order of priority is detected, the blinking control portion may cause the light emitting portion to blink using the blinking pattern that is linked to one of a newest detection information and a newest operating state.

In addition, when the operation detection portion detects at least one of that the information processing device is being driven by a battery and that the housing is in a closed state, the blinking control portion may stop at least one of detection by the detection portion and light emission by the light emitting portion. In this case, the blinking control portion may prohibit light emission by the light emitting portion only when the operation detection portion further detects that the information processing device is in power save mode.

Additionally, the light emitting portion can be positioned in a location in which the light emitting portion can be verified when the housing is in a closed state. The detection portion and the light emitting portion may be provided in different areas. Further, the detection portion may be covered by a shielding member that shields the detection portion from external noise.

According to another embodiment of the present invention, there is provided an information notification method including the steps of: detecting an approach or a touch of an operating body by a detection portion provided on an external surface of a housing having a first housing and a second housing that is openably/closably attached to the first housing; and controlling blinking of a light emitting portion based on detection information detected by the detection portion and on a blinking pattern that is linked to the detection information detected by the detection portion and stored in a storage portion.

According to another embodiment of the present invention, there is provided a computer program that causes a computer to function as a blinking control unit that controls blinking of a light emitting portion based on detection information detected by a detection portion provided on an external surface of a housing having a first housing and a second housing that is openably/closably attached to the first housing, and on a blinking pattern that is linked to the detection information detected by the detection portion and stored in a storage portion.

According to the embodiments of the present invention, an information processing device, an information notification method and a computer program can be provided that allow a user to easily recognize operating states.

BRIEF DESCRIPTION OF THE DRAWINGS

FIG. 10 is an explanatory diagram illustrating links between user operations determined from detection results of a detection portion and blinking pattern images;

FIG. 12 is an explanatory diagram illustrating links between operating states of the information processing device and blinking pattern images;

DETAILED DESCRIPTION OF THE PREFERRED EMBODIMENTS

Figure 1:
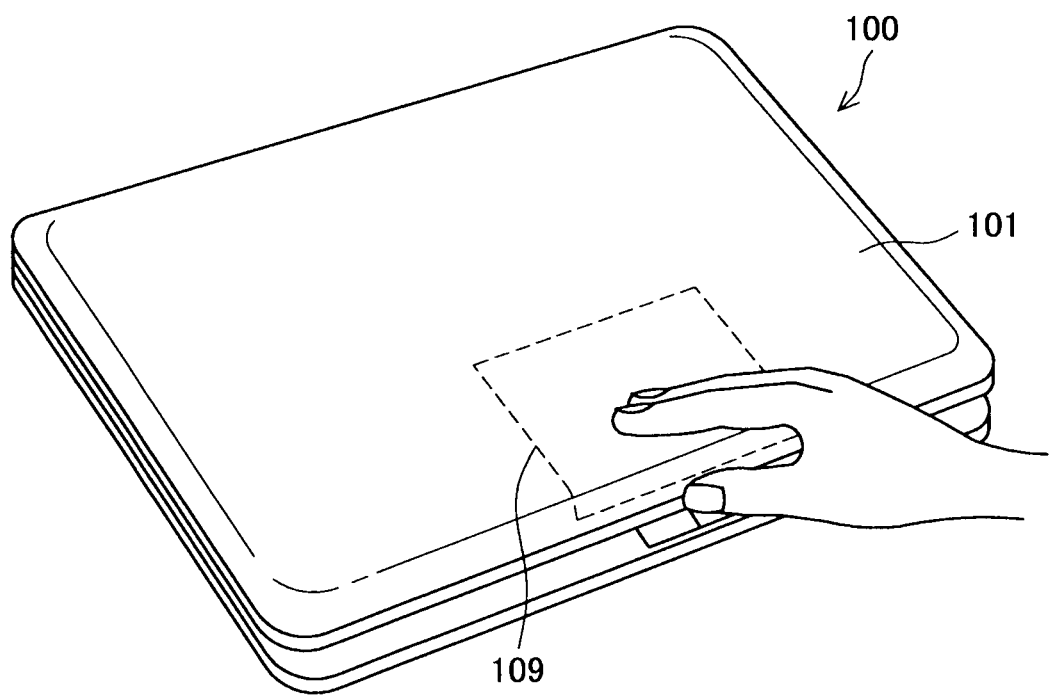
FIG. 1 is a perspective view showing an external appearance of a notebook type personal computer that is an example of an information processing device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Structure of Information Processing Device

Figure 2:
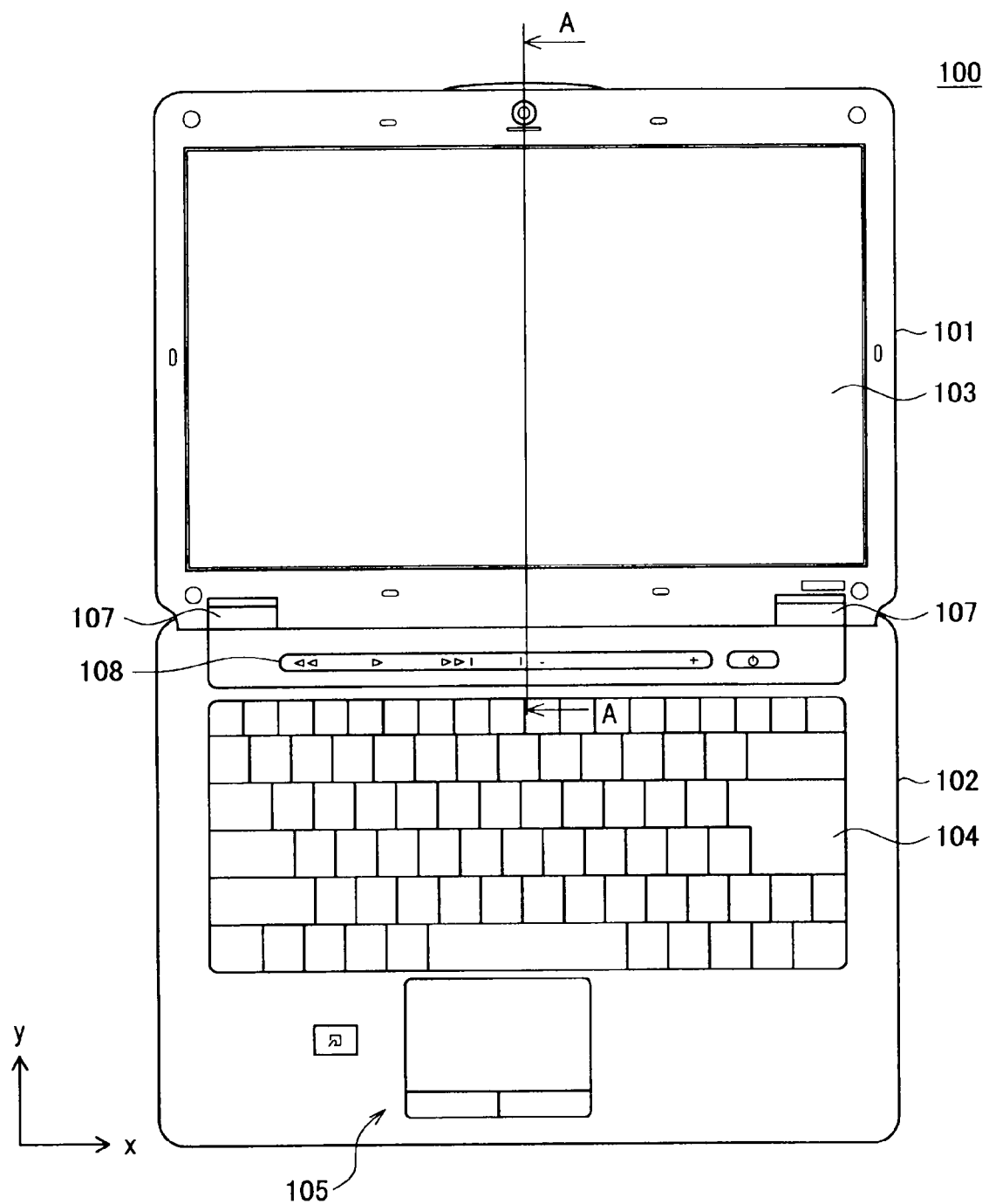
FIG. 2 is a plan view showing the notebook type personal computer that is an example of the information processing device according to the present embodiment in an open state.
Figure 3:
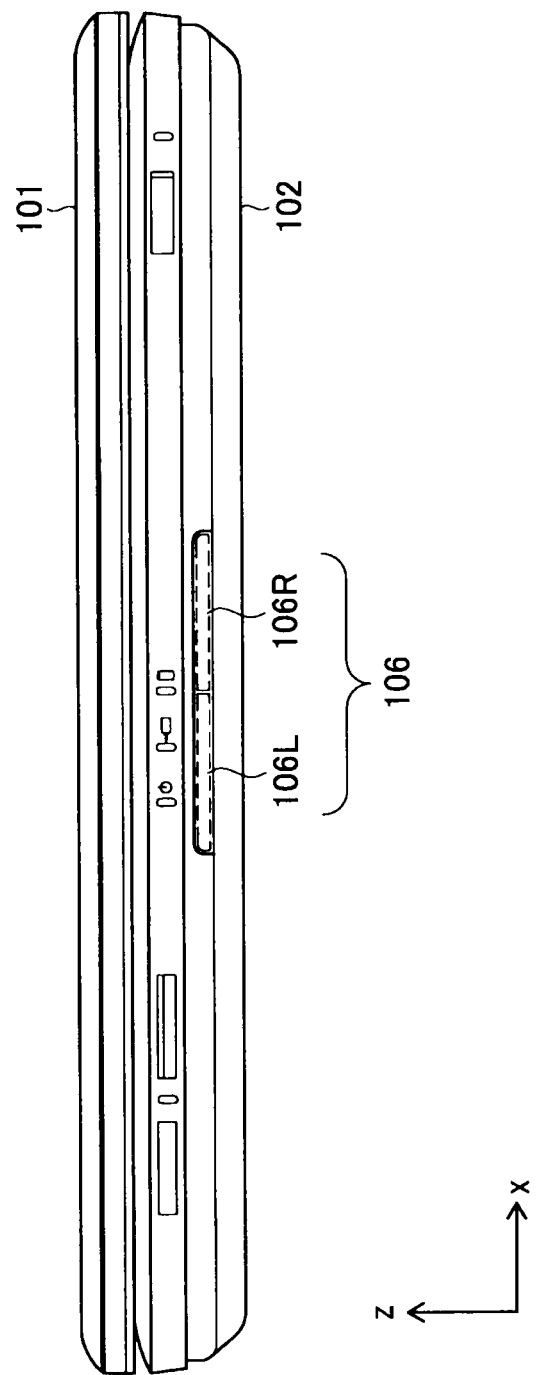
FIG. 3 is a side view showing the notebook type personal computer that is an example of the information processing device according to the present embodiment in a closed state.
Figure 4:
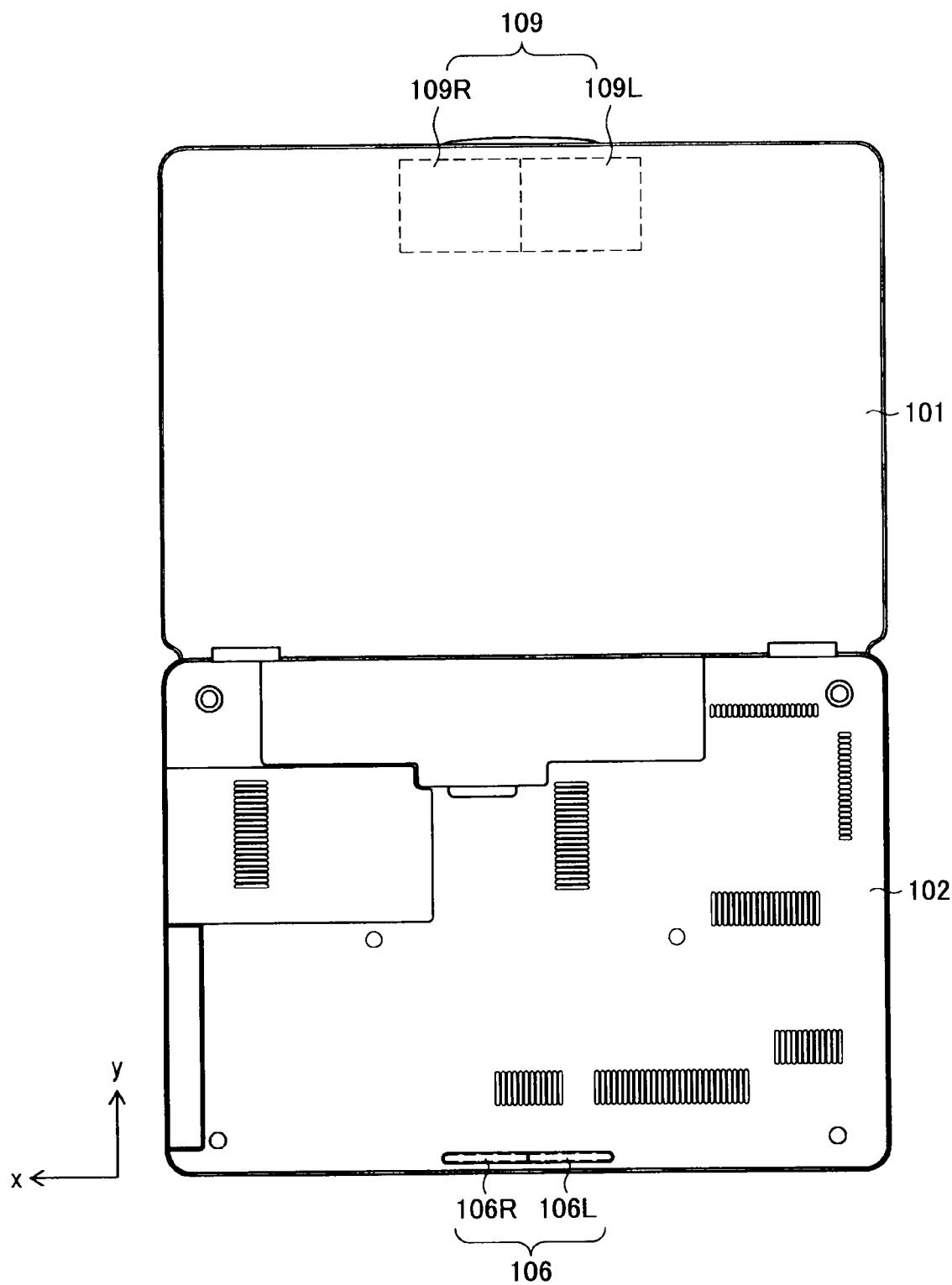
FIG. 4 is a bottom view of the notebook type personal computer that is an example of the information processing device according to the present embodiment in an open state.
Figure 5:
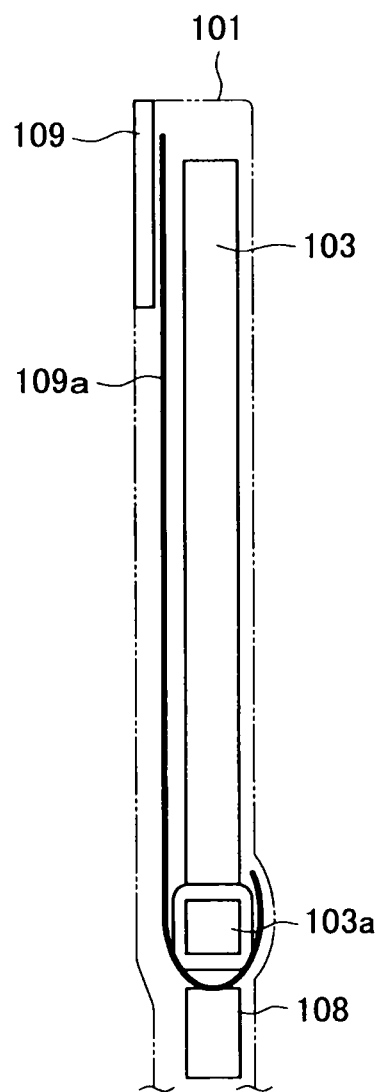
FIG. 5 is a cross-section view showing a cross section taken along the cross-section line A-A of the information processing device in FIG. 1.

First, the structure of an information processing device 100 according to an embodiment of the present invention will be explained with reference to FIG. 1 to FIG. 5. Note that FIG. 1 is a perspective view showing an external appearance of a notebook type personal computer that is an example of the information processing device 100 according to the present embodiment. FIG. 2 is a plan view showing the notebook type personal computer that is an example of the information processing device 100 according to the present embodiment in an open state. FIG. 3 is a side view showing the notebook type personal computer that is an example of the information processing device 100 according to the present embodiment in a closed state. FIG. 4 is a bottom view of the notebook type personal computer that is an example of the information processing device 100 according to the present embodiment in an open state. FIG. 5 is a cross-section view showing a cross section taken along the cross-section line A-A of the information processing device 100 in FIG. 1.

As shown in FIG. 1, the information processing device 100 according to the present embodiment is, for example, the notebook type personal computer (hereinafter sometimes referred to simply as the "PC"). As shown in FIG. 2, the PC that is an example of the information processing device 100 includes an upper surface portion 101 provided with a display portion 103 that displays video and images etc. and a lower surface portion 102 provided with input portions such as a keyboard 104, a touch pad 105 and the like. The upper surface portion 101 and the lower surface portion 102 of the information processing device 100 are openably/closably connected to each other via hinged portions 107. The lower surface portion 102 of the information processing device 100 includes an input device 108 to perform multi-media content AV operation and volume control etc., and also includes a power switch etc. A user can open the PC by gripping the upper surface portion 101 from the reverse side of the display portion 103 and moving the upper surface portion 101 away from the lower surface portion 102, and can then use the PC.

In the information processing device 100 according to the present embodiment, a touch sensor 109 is provided on the reverse surface of the display portion 103 of the upper surface portion 101. The touch sensor 109 is provided such that the information processing device 100 responds interactively to operations by the user. For that reason, it is preferable for the touch sensor 109 to be provided in a position in which it is likely to be touched when the user is using the information processing device 100. By positioning the touch sensor 109 on the reverse surface of the display portion 103, as in the present embodiment, even when the information processing device 100 is closed, the information processing device 100 can respond to operations by the user. Further, by positioning the touch sensor 109 in a center section of the edge of the upper surface portion 101 facing the hinge portions 107, as shown in FIG. 1, the user touches the touch sensor 109 when using the PC and when finishing using the PC. By positioning the touch sensor 109 in such a way, it is possible to cause the information processing device 100 to respond to events such as starting and finishing use of the PC.

As shown in FIG. 4, the touch sensor 109 is formed of two adjacently positioned touch sensors. The direction of movement of the operating body can be ascertained from detection values of the two touch sensors. Note that the number of the touch sensors is not limited to two, and a single touch sensor or more than two touch sensors may be provided. When more than two touch sensors are provided, more complex gesture commands etc. can be detected with greater accuracy. The touch sensor 109 according to the present embodiment is a detection portion that detects electrostatic capacitance that changes when a finger approaches or touches the touch sensor 109. Generally, it is possible that electrostatic capacitance can change under the influence of external noise other than a human body, such as from the liquid crystal that is the display portion 103, a liquid crystal inverter 103a, a communication device (not shown in the figures) and so on. For that reason, as shown in FIG. 5, a shielding member 109a is provided between the touch sensor 109 and the display portion 103 and the liquid crystal inverter 103a, to shield the touch sensor 109 such that it is not influenced by external noise. The shielding member 109a can be, for example, an aluminum sheet.

Moreover, when a touch sensor is used as the input device 108, it is necessary to shield it from external noise in a similar manner. Therefore, for the shielding member 109a, for example, the existing aluminum sheet that is provided on the reverse side of the liquid crystal is extended to the hinge portion 107 side and is passed between the liquid crystal inverter 103a and the input device 108 such that the aluminum sheet encloses the liquid crystal inverter 103a, as shown in FIG. 5. In this way, the noise from the liquid crystal inverter 103a to which the touch sensor of the input device 108 is subject can be effectively reduced. Furthermore, it is not necessary to separately provide a noise shielding member, as the existing aluminum sheet can be effectively used to eliminate noise, and thus an effective noise countermeasure can be achieved without causing an increase in the number of components.

In addition, as shown in FIG. 3 and FIG. 4, the information processing device 100 according to the present embodiment is provided with a light emitting portion 106 on an external surface on the front side of the lower surface portion 102. The light emitting portion 106 is formed of a first light emitting portion 106L and a second light emitting portion 106R. The light emitting portion 106 blinks in response to input operations on the touch sensor 109 or in response to event states of the information processing device 100, and thus functions as a notification portion that notifies the user of reactions to input operations and of event states. By the blinking of the light emitting portion 106, the user can recognize reactions and operating states of the information processing device 100. Note that details of methods of information notification by the light emitting portion 106 will be explained later.

Next, a hardware configuration of the information processing device 100 according to the present embodiment will be explained with reference to FIG. 6. Note that FIG. 6 is an explanatory diagram showing the hardware configuration of the information processing device 100 according to the present embodiment.

Figure 6:
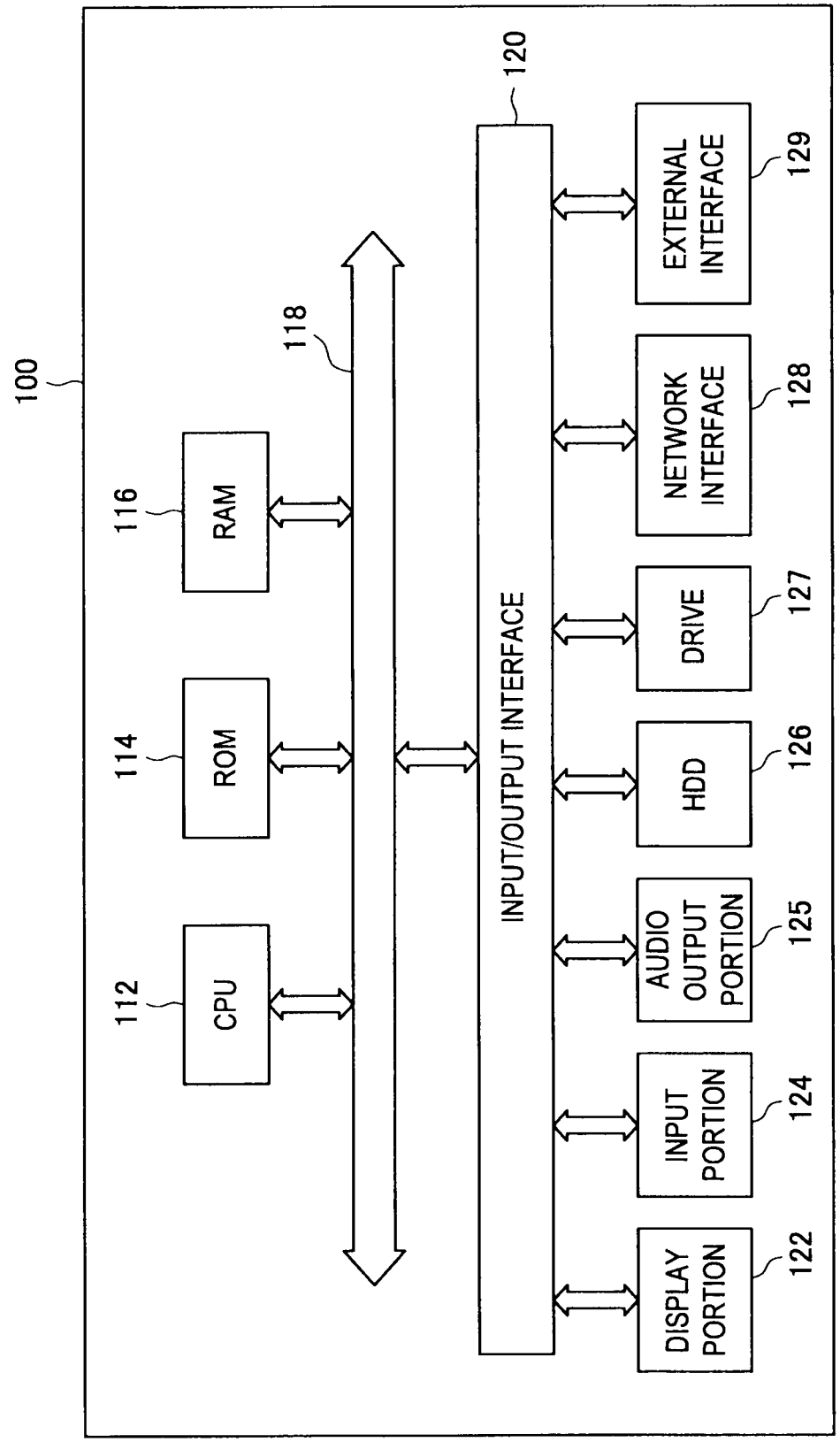
FIG. 6 is an explanatory diagram showing a hardware configuration of the information processing device according to the present embodiment.

As shown in FIG. 6, the information processing device 100 according to the present embodiment includes a CPU 112, a ROM 114, a RAM 116, an internal bus 118, an input/output interface 120, a display portion 122, an input portion 124, an audio output portion 125, an HDD 126, a drive 127, a network interface 128 and an external interface 129.

The CPU 112 performs numerical calculations and information processing, instrument control and the like. The CPU 112 performs the numerical calculations etc. by sequentially reading programs stored in the ROM 114 and data stored in the RAM 116. The CPU 112 also performs numerical calculations, for example, based on input signals corresponding to input information input by the user of the information processing device 100 via the input portion 124, or based on signals received from an external server (not shown in the figures) etc. via the network interface 128.

In principle, the ROM 114 stores data that is not changed, among the programs and computing parameters used by the CPU 112 for the numerical calculations, information processing and instrument control etc. In principle, the RAM 116 stores data that is appropriately changed in all types of processing, among the programs and computer parameters used by the CPU 112 for the numerical calculations, information processing and instrument control etc.

The internal bus 118 is a path used to perform data conversion inside the information processing device 100. The CPU 112, the ROM 114 and the RAM 116 are mutually connected by the internal bus 118. Additionally, the internal bus 118 is connected to the input/output interface 120. In this way, input signals corresponding to input information input from the input portion 124, and signals received from an external server or the like via the network interface 128 can be transmitted to the CPU 112 via the internal bus 118.

The input/output interface 120 relays information input and output exchanges. The input/output interface 120 is connected to the display portion 122, the input portion 124, the audio output portion 125, the HDD 126, the drive 127, the network interface 128 and the external interface 129. As described above, the input/output interface 120 is also connected to the internal bus 118. The input/output interface 120 transmits input signals corresponding to input information input from the input portion 124, and signals received from an external server or the like via the network interface 128, to the CPU 112 via the internal bus 118.

The display portion 122 displays the content of information input from the input portion 124, and information relating to the results etc. of the numerical calculations, information processing and instrument control performed by the CPU 112. The display portion 122 is formed, for example, of a CRT, a liquid crystal display device, an organic EL display device or the like.

The input portion 124 is a functional portion that is operated for the user of the information processing device 100 to input information. In addition to the keyboard 104 and the touch pad 105 shown in FIG. 2, the input portion 124 is formed, for example, of a mouse, a pen tablet or the like.

The audio output portion 125 outputs audio that is generated when processes involving audio output are performed on the information processing device 100.

The HDD 126 is a device that drives an internal hard disk, and stores/plays back programs and information that are read and executed by the CPU 112. The drive 127 is a device that performs transmission and reception of data between a portable storage medium and the information processing device 100 when the portable storage medium is inserted. A magnetic disk, an optical disk, a magneto-optical disk, a semiconductor memory or the like can be used as the portable storage medium. In this case, the drive 127 can be a device that can read these storage media.

The network interface 128 is a functional portion that performs transmission and reception of information with an external server. The external interface 129 is a functional portion that performs transmission and reception of information with a peripheral device that is connected to the information processing device 100 and used. For example, a universal serial bus (USB) port or the like can be used as the external interface 129. Note that information input devices, such as a keyboard or a mouse etc. that are an example of the input portion 124, can be connected to the external interface 129 and used.

Figure 7:
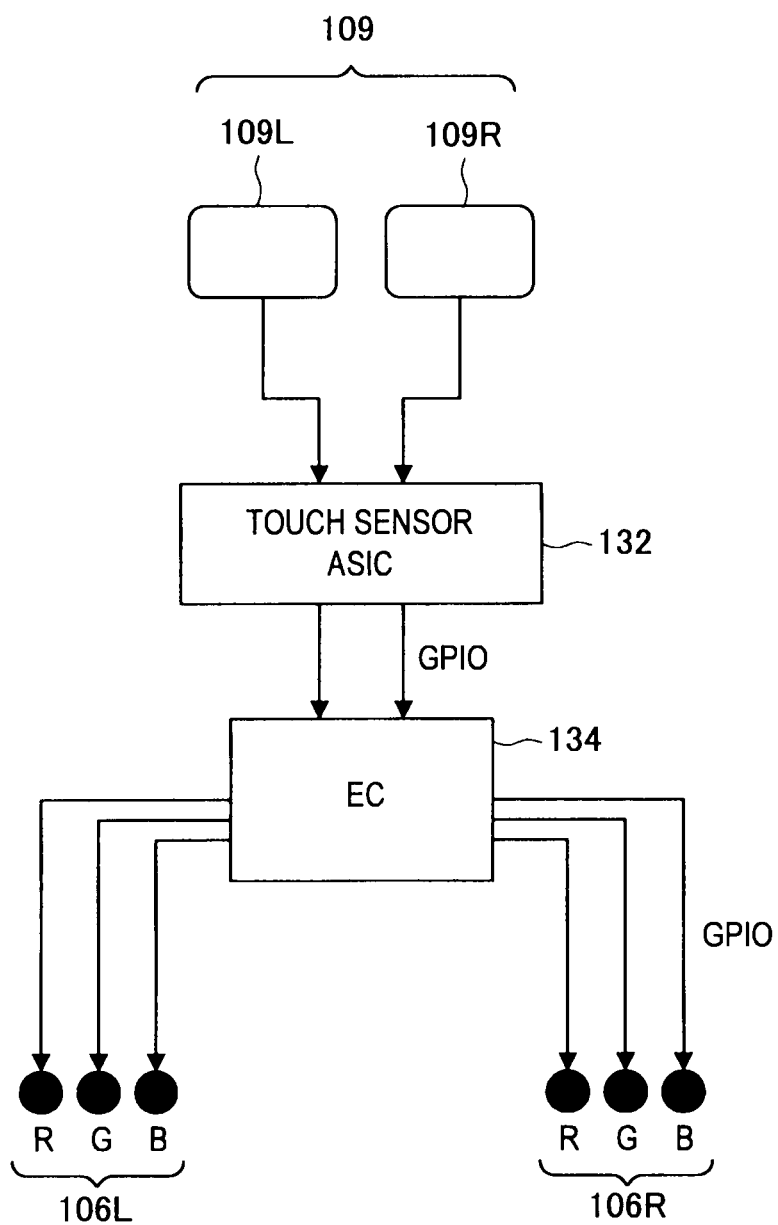
FIG. 7 is an explanatory diagram showing a structure that causes a light emitting portion according to the present embodiment to blink in accordance with detection values of a touch sensor.
Figure 8:
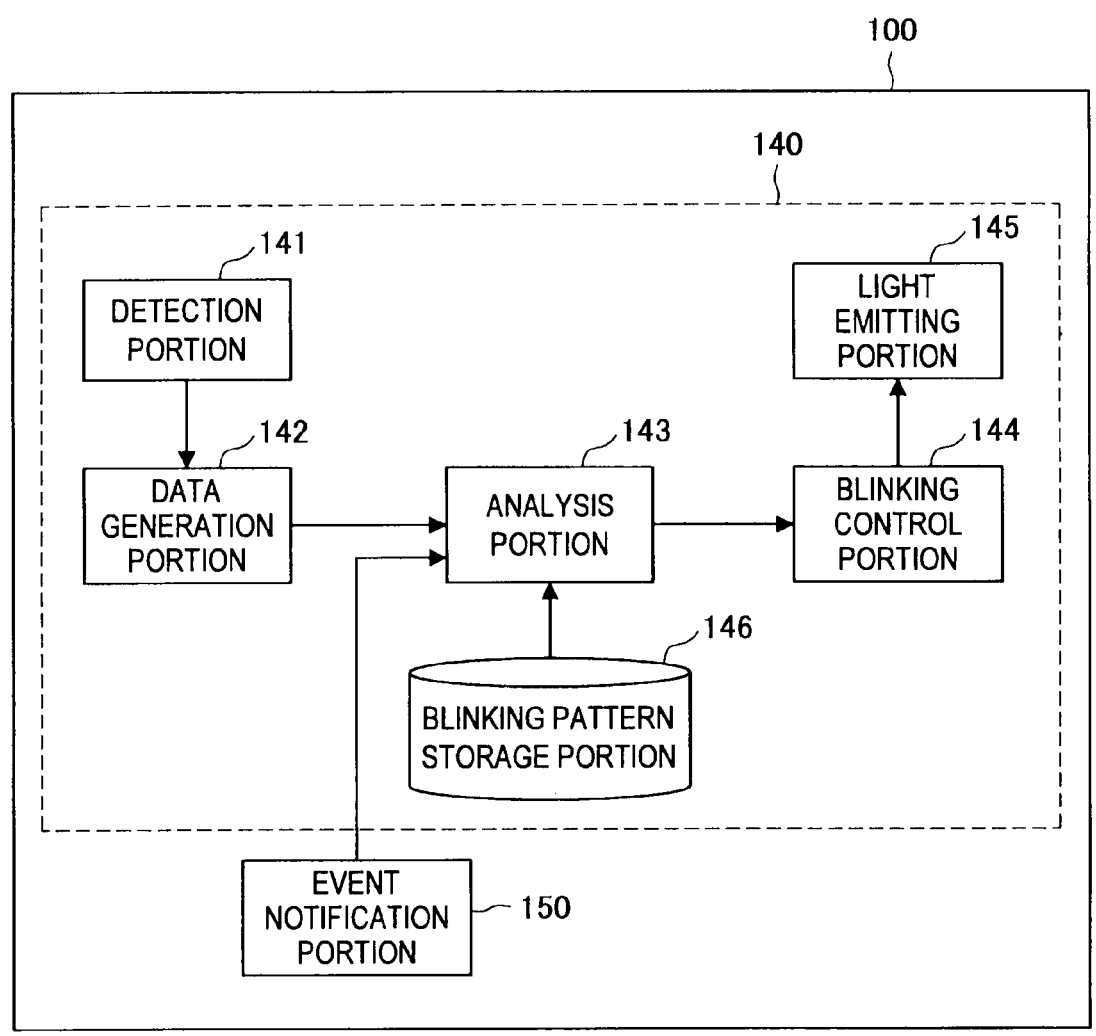
FIG. 8 is a block diagram showing a structure of an input information processing portion of the information processing device according to the present embodiment.

The hardware configuration of the information processing device 100 according to the present embodiment is explained above. By causing the light emitting portion 106 to blink in accordance with user input operations or operating states of the information processing device 100, the information processing device 100 according to the present embodiment allows the user to easily recognize operating states of the information processing device 100. Hereinafter, the structure and functions of an information notification processing portion in which the light emitting portion 106 performs notification of operating states of the information processing device 100 will be explained with reference to FIG. 7 and FIG. 8. FIG. 7 is an explanatory diagram showing an example of a structure that causes the light emitting portion 106 to blink in accordance with detection values of the touch sensor 109. FIG. 8 is a block diagram showing a structure of an information notification processing portion 140 of the information processing device 100 according to the present embodiment.

Structure and Functions of Information Notification Processing Portion

First, based on FIG. 7, a specific example of the structure of the information notification processing portion 140 according to the present embodiment will be explained. As shown in FIG. 7, the information notification processing portion 140 includes, for example, the light emitting portion 106 that performs notification of operating states, the touch sensor 109 that detects user input operations, a touch sensor ASIC 132 and an embedded controller (EC) 134.

As shown in FIG. 7, the light emitting portion 106 is formed of the first light emitting portion 106L and the second light emitting portion 106R, which each respectively include three LEDs, namely a red LED (R), a green LED (G) and a blue LED (B). The light emitting portion 106 performs notification of the operating state of the information processing device 100 and also performs notification of reactions in response to user operations. Here, as the first light emitting portion 106L and the second light emitting portion 106R are structured such that they have the three primary colors of light (red, green and blue), full-color indication can be achieved, and therefore the power of expression when performing notification of information can be improved. In the present embodiment, the first light emitting portion 106L is on the left side when facing the device, and the second light emitting portion 106R is on the right side when facing the device, adjacent to the first light emitting portion 106L.

The light emitting portion 106 can emit light in response to input operations on the touch sensor 109. As described above, the touch sensor 109 is provided on the reverse surface of the display portion 103 on the upper surface portion 101 of the information processing device 100. The touch sensor 109 is formed of a first touch sensor 109L that performs detection in a left area and a second touch sensor 109R that performs detection in a right area. By providing the two touch sensors 109L and 109R, it is possible to detect movement of operations in the direction in which the two touch sensors 109L and 109R are adjacent. As a result, different operations can be distinguished by the touch sensor 109, such as, for example, touching, rubbing, stroking and tapping. Changes in electrostatic capacitance detected by the first touch sensor 109L and the second touch sensor 109R are transmitted to the touch sensor ASIC 132.

Changes in electrostatic capacitance are detected by the touch sensor 109, then the touch sensor ASIC 132 digitalizes the change values and transmits them to the EC 134. In the present embodiment, the detection data of the first touch sensor 109L and the second touch sensor 109R are transmitted to the EC 134 using GPIO communication.

Based on the detection results of the touch sensor 109, the EC 134 analyzes operations performed on the touch sensor 109. In addition, the EC 134 detects operating states of the information processing device 100, such as other operating events of the information processing device 100 that are controlled by the EC 134, power source status, or events that are notified to the EC 134 from applications. When the EC 134 receives detection data detected by the touch sensor 109 from the touch sensor ASIC 132 via GPIO communication, it causes the light emitting portion 106 to emit light in accordance with a blinking pattern that corresponds to results of analysis of the detection data. At that time, the EC 134 transmits drive information to cause the light emitting portion 106 to emit light to the light emitting portion 106 using GPIO communication.

An example of the structure of the information notification processing portion 140 to cause blinking in accordance with detection values of the touch sensor 109 is explained above. Next, the functional structure of the information notification processing portion 140 will be explained based on FIG. 8. The information notification processing portion 140 causes the light emitting portion 106 to emit light in accordance with user input operations analyzed from detection values of the touch sensor 109 or based on the operating state of the information processing device 100.

As shown in FIG. 8, the information notification processing portion 140 of the information processing device 100 according to the present embodiment includes a detection portion 141, a data generation portion 142, an analysis portion 143, a blinking control portion 144, a light emitting portion 145 and a blinking pattern storage portion 146.

The detection portion 141 is a functional portion that detects inputs, and corresponds to the touch sensor 109 shown in FIG. 4. As described above, the detection portion 141 is a sensor that detects electrostatic capacitance, which changes when a finger approaches or touches the detection portion 141. The electrostatic capacitance that changes corresponding to user input operations is transmitted by the detection portion 141 to the data generation portion 142 as a detection value.

The data generation portion 142 is a functional portion that converts the detection values from the detection portion 141 into digital data signals. The data generation portion 142 converts changes in the electrostatic capacitance that is a detection value into digital data signals. The data generation portion 142 can be formed of the touch sensor ASIC 132 shown in FIG. 7. The data generation portion 142 transmits the digital data signals generated from the detection values to the analysis portion 143.

The analysis portion 143 is a functional portion that analyzes user input operations based on detection values from the detection portion 141, and can be formed of the EC 134 shown in FIG. 7. The analysis portion 143 receives the digital data signals of the touch sensor 109 detection values from the data generation portion 142, and analyzes what type of operation has been performed by the user on an operation area, namely the area provided on the detection portion 141. Then, the analysis portion 143 acquires, from the blinking pattern storage portion 146, a blinking pattern corresponding to analysis results that causes the light emitting portion 145 to blink and transmits the blinking pattern to the blinking control portion 144. The blinking pattern is a method for blinking of the light emitting portion 145, prescribed by a period of time and a timing at which the light emitting portion 145 is caused to emit light, a color of the light emitted and so on.

In addition, the analysis portion 143 can receive information about operating states from an event notification portion 150, such as a power source on/off state of the information processing device 100 or opening and closing of the upper surface portion 101 of the information processing device 100. The analysis portion 143 acquires the blinking pattern corresponding to the operating state received from the event notification portion 150 and transmits the blinking pattern to the blinking control portion 144.

The blinking control portion 144 is a control portion that controls blinking of the light emitting portion 145. Based on the blinking pattern received from the analysis portion 143, the blinking control portion 144 generates light emission drive information that causes the light emitting portion 145 to emit light. Then, the blinking control portion 144 causes the light emitting portion 145 to emit light based on the light emission drive information. Note that the light emission drive information is information to actually cause the light emitting portion 145 to emit light, and is information that includes the period of time over which the light emitting portion 145 is caused to emit light and the voltage applied to the light emitting portion 145.

The light emitting portion 145 is a member that emits light and is formed, for example, of an LED. The light emitting portion 145 corresponds to the light emitting portion 106 shown in FIG. 3. The light emitting portion 145 is driven to emit light by the blinking control portion 144 based on the light emission drive information and emits light.

The blinking pattern storage portion 146 is a storage portion that stores blinking patterns of the light emitting portion 145. In the blinking pattern storage portion 146 are also stored input operations that are analyzed by the analysis portion 143 or operating states of the information processing device 100, and these are stored such that they are linked with the blinking patterns, which are prescribed by the period of time and the timing at which the light emitting portion 145 is caused to emit light, the color of the light emitted and so on. Blinking patterns may be set in advance in the blinking pattern storage portion 146. Alternatively, the user can also store blinking pattern prescription information that links the blinking patterns of the light emitting portion 145 to input operations or operating states of the information processing device 100.

Figure 9:
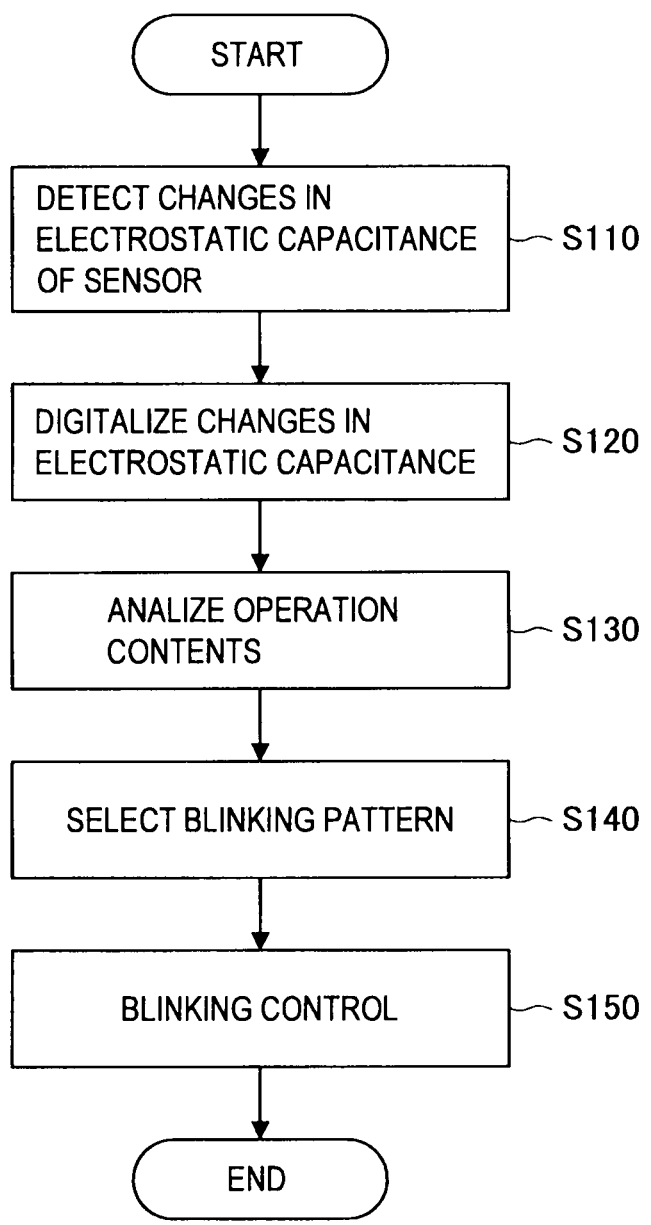
FIG. 9 is a flow chart showing an input information process by an information notification processing portion according to the present embodiment.
Figure 11:
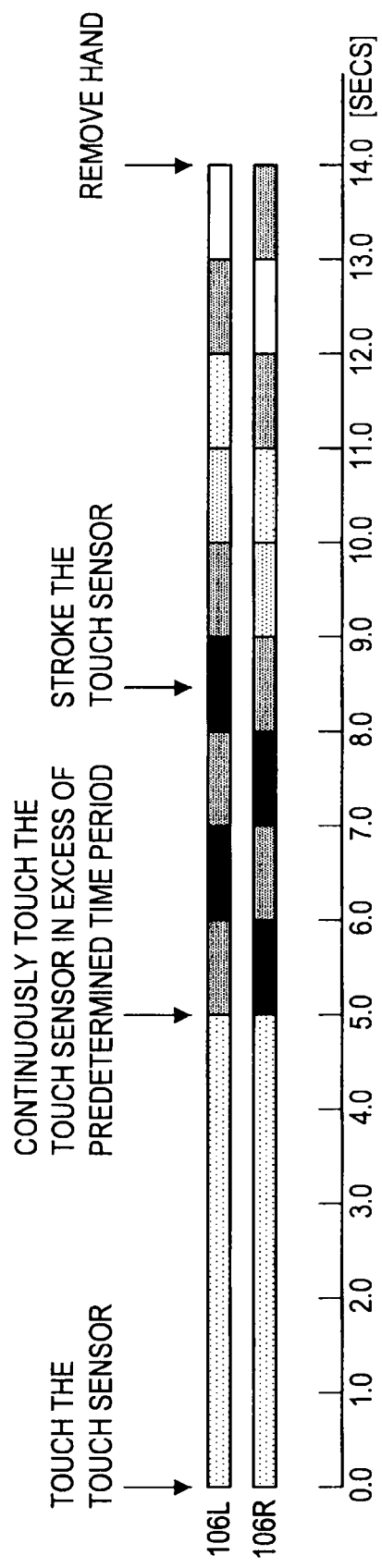
FIG. 11 is an explanatory diagram showing an example of the light emitting portion blinking patterns in accordance with user operations.

The structure of the information notification processing portion 140 of the information processing device 100 according to the present embodiment is explained above. Next, among information notification processes by the information notification processing portion 140 according to the present embodiment, an information notification process will be explained in which a reaction to a user input operation detected by the touch sensor 109 is notified to the user by the light emitting portion 145. The explanation will be made with reference to FIG. 9 to FIG. 11. Note that FIG. 9 is a flow chart showing an input information process by the information notification processing portion 140 according to the present embodiment. FIG. 10 is an explanatory diagram illustrating links between user operations determined from detection results of the detection portion 141 and blinking pattern images. FIG. 11 is an explanatory diagram showing an example of blinking patterns of the light emitting portion 145 in accordance with user operations.

Information Notification Process in Response to Input Operation on Touch Sensor

The information notification processing portion 140 according to the present embodiment is a portion that causes the light emitting portion 106 to emit light based on detection results of the touch sensor 109 or an event state of the information processing device 100. As shown in FIG. 9, in processing by the information notification processing portion 140, first, changes in electrostatic capacitance are detected by the detection portion 141 (step S110). For example, the user operates the operation area provided on the touch sensor 109 that is the detection portion 141, such as touching the operation area, placing his or her hand and continuously touching the operation area or stroking the operation area etc. At that time, the touch sensor 109 that is the detection portion 141 detects changes in electrostatic capacitance.

In the information processing device 100 according to the present embodiment, the detection portion 141 is formed of the two touch sensors 109L and 109R. For example, the user places his or hand on the operation area, and repeatedly moves his or her hand from the area on which the first touch sensor 109L is positioned (hereinafter sometimes referred to as the "left area") to the area on which the second touch sensor 109R is positioned (hereinafter sometimes referred to as the "right area"). First, when the user places his or her hand on the operation area, the electrostatic capacitance detected by the first touch sensor 109L increases. Then, when the user slides his or her hand from the left area to the right area, the electrostatic capacitance detected by the first touch sensor 109L decreases and the electrostatic capacitance detected by the second touch sensor 109R increases. After that, when the user removes his or her hand from the operation area, the electrostatic capacitance detected by the second touch sensor 109R decreases. In this way, the detection portion 141 transmits electrostatic capacitance that indicates changes in the operation on the operation area by the user to the data generation portion 142 as a detection value.

Next, the data generation portion 142 digitalizes the changes in electrostatic capacitance (step S120). When the data generation portion 142 receives electrostatic capacitance detected by the detection portion 141, it converts changes in the electrostatic capacitance to digital data. In FIG. 7, for example, detection values detected by the touch sensor 109 are digitalized by the touch sensor ASIC 132 and firmware that exists within the ROM of the touch sensor ASIC 132.

Further, when the changes in the electrostatic capacitance are digitalized at step S120, the content of the user operation is analyzed by the analysis portion 143 (step S130). After the analysis portion 143 receives the digital data from the data generation portion 142, it analyzes what type of operation has been performed by the user on the operation area. For example, the analysis portion 143 receives digital data from the data generation portion 142 that indicates repeated alternate increases and decreases in the electrostatic capacitance detected by the first touch sensor 109L and the electrostatic capacitance detected by the second touch sensor 109R. In this case, the analysis portion 143 can analyze from the digital data that the user is repeatedly moving his or her hand from the left area of the operation area to the right area.

When the content of the operation is analyzed at step S130, the analysis portion 143 acquires the blinking pattern of the light emitting portion 145 that corresponds to the content of the operation (step S140). The information processing device 100 according to the present embodiment causes the light emitting portion 145 to blink in accordance with an emotional image that is developed corresponding to the content of the operation. An example of emotional images developed corresponding to the content of the operation is shown in FIG. 10. As shown in FIG. 10, for example, from the operation of touching the operation area by the user, an image can be formed of the emotion of happiness called up by the user. Additionally, if, for example, the user places his or her hand on the operation area and continuously touches it, an image can be formed from this operation of the emotion of peacefulness, and if the user strokes the operation area, an image can be formed from this operation of the emotion of great joy.

Blinking patterns that cause the light emitting portion 145 to emit light are respectively linked to correspond with each of the images of emotions developed for such operation contents. In other words, an illumination image that is expressed by the blinking pattern corresponds to the image of the emotion that is developed with respect to the content of the operation. For example, with respect to the emotion of happiness that is expressed when the user touches the operation area, the light emitting portion 145 is caused to emit light of a color that conveys a bright impression, such as yellow, for example. Further, for example, with respect to the emotion of peacefulness that is expressed when the user places his or her hand on the operation area and continuously touches it, the light emitting portion 145 is caused to emit light of a color that conveys a relaxing impression, such as blue, for example. Furthermore, the light emitting portion 145 according to the present embodiment is formed of the two light emitting portions 106L and 106R that are both able to express images in full color. As a result, the colors of the light emitted by the two light emitting portions 106L and 106R can be contrasted, or the timing at which light is emitted can be different, thus improving the power of expression realized by the blinking of the light emitting portion 106.

With respect to the images of emotions developed corresponding to the user operation content, the blinking pattern storage portion 146 stores the blinking patterns that are prescribed by the period of time over which the light emitting portion 145 is caused to emit light, the timing at which the light is emitted, the color of the light emitted and so on. The analysis portion 143 acquires the blinking pattern that is linked to the analyzed operation content from the blinking pattern storage portion 146, and transmits the acquired blinking pattern to the blinking control portion 144.

After that, the blinking control portion 144 causes the light emitting portion 145 to blink (step S150). The blinking control portion 144 generates light emission drive information that drives the light emitting portion 145 to emit light, based on the blinking pattern that is formed of information such as the timing at which the light emitting portion 145 is caused to emit light, the color of the light emitted, the degree of brightness and so on. Then, the blinking control portion 144 causes the light emitting portion 145 to blink in accordance with the light emission drive information. In this way, the information processing device 100 notifies the user of reactions to input operations detected by the touch sensor 109.

The information notification process by the information notification processing portion 140 according to the present embodiment is explained above. Next, an example of blinking patterns of the light emitting portion 145 changing in accordance with user operations is shown in FIG. 11. FIG. 11 shows a timeline of the blinking of the first light emitting portion 106L and the second light emitting portion 106R. As shown in FIG. 11, first, when the user touches the touch sensor 109, the first light emitting portion 106L and the second light emitting portion 106R both light up in a color (yellow, for example) that conveys an impression of brightness. At that time, the blinking control portion 144 can cause illumination with fade-in changes added, such that each of the light emitting portions 106L and 106R are caused to gradually get brighter or grow deeper in color.

When the detection portion 141 detects that the user is continuously touching the touch sensor 109 in excess of a predetermined period of time (for approximately 5 seconds or more, for example), it causes the color to change to a color that conveys a relaxing impression (blue or purple, for example). Then, the blinking control portion 144, based on the blinking pattern, causes the color of the light emitted by the first light emitting portion 106L and the color of the light emitted by the second light emitting portion 106R to change alternately in slow time units (in units of approximately one second, for example). In addition, if the user strokes the area provided on the touch sensor 109 (the operation area), colors are added to the emitted light, and the colors of each of the light emitting portions 106L and 106R are caused to change. After that, if the user removes his or her hand from the touch sensor 109, each of the light emitting portions 106L and 106R are extinguished. At that time, the blinking control portion 144 can add fade out changes when extinguishing each of the light emitting portions 106L and 106R, such that the light emitting portions 106L and 106R gradually disappear or gradually grow lighter in color.

In this way, with respect to operations performed by the user on the touch sensor 109, the information notification processing portion 140 according to the present embodiment causes the light emitting portion 145 to blink using the blinking pattern that is suggested from the operation contents. As a result, the information processing device 100 can convey an impression to the user of being a familiar presence. Further, the information processing device 100 according to the present embodiment is provided with the touch sensor 109 in a position in which it is frequently touched by the user when using the information processing device 100. Consequently, when the user is using the information processing device 100, there are many opportunities to touch the touch sensor 109 and each time it is touched, the light emitting portion 145 emits light. In this way, by the light emitting portion 145 conducting the performance of blinking when the information processing device 100 is used, a sense of enjoyment can be conveyed to the user in using the information processing device 100.

Note that, for the purpose of power saving, the information processing device 100 may be set up such that the light emitting portion 145 does not perform blinking corresponding to the content of operations on the touch sensor 109 when the information processing device 100 is in battery mode and is driven by a battery. In this case, blinking by the light emitting portion 145 may be prohibited only when the information processing device 100 is in power save mode. When the information processing device 100 is driven by the battery and when the information processing device 100 is in power save mode, that state is notified by the event notification portion 150 and it is determined by the analysis portion 143 to prohibit blinking of the light emitting portion 145.

Furthermore, when in battery mode, it is also acceptable that detection by the touch sensor 109 is stopped, in addition to stopping emission of light by the light emitting portion 145. In this way, further power conservation can be achieved. Alternatively, detection by the touch sensor 109 and light emission by the light emitting portion 145 may be stopped when in battery mode and when the notebook PC is in a closed state. In addition, these power saving measures may be performed only when the information processing device 100 is in power save mode. In this way, when it is determined that the notebook PC is in a state in which it is not being used, the emission of light by the light emitting portion 145 and detection by the touch sensor 109 can be stopped, and power can thus be saved.

Notification Process of Operating States of Information Processing Device

Figure 13:
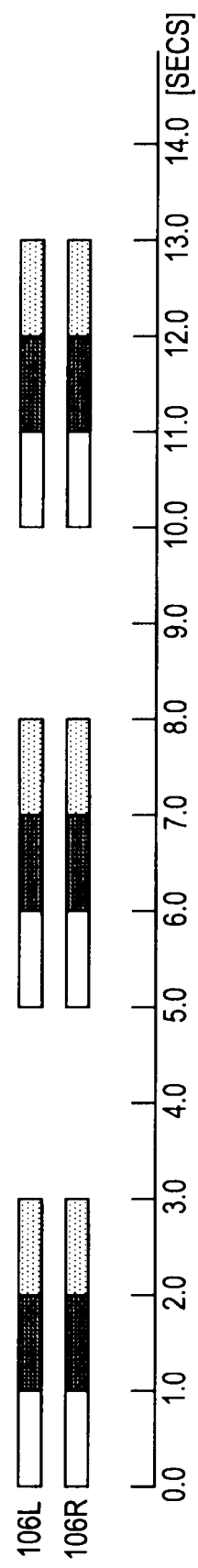
FIG. 13 is an explanatory diagram showing an example of the light emitting portion blinking pattern in a power save mode.

Furthermore, the information notification processing portion 140 according to the present embodiment can cause the light emitting portion 145 to blink in accordance with the operating state of the information processing device 100. Hereinafter, an information notification process by blinking of the light emitting portion 145 in accordance with the operating state of the information processing device 100 will be explained with reference to FIG. 12 and FIG. 13. Note that FIG. 12 is an explanatory diagram illustrating links between operating states of the information processing device 100 and images of the blinking pattern. FIG. 13 is an explanatory diagram showing an example of the light emitting portion 145 blinking pattern when the information processing device 100 is in power save mode.

In a similar way to the prescription of the blinking pattern in accordance with the contents of operations on the touch sensor 109 described above, the light emitting portion 145 is caused to emit light by the blinking control portion 144 in accordance with an image suggested from the operating state of the information processing device 100. As shown in FIG. 12, for example, when the power source of the information processing device 100 is switched on, the light emitting portion 145 is caused to blink such that it expresses a lively image. On the other hand, when the power source of the information processing device 100 is switched off, the light emitting portion 145 is caused to blink such that it expresses an image of melancholy. Further, when the upper surface portion 101 of the information processing device 100 is opened, for example, the light emitting portion 145 is caused to blink such that an image of excitement is expressed, and when the upper surface portion 101 of the information processing device 100 is closed, the light emitting portion 145 is caused to blink such that an image of sadness is expressed. Furthermore, for example, when it is detected that an adaptor card is inserted into or removed from the information processing device 100, the light emitting portion 145 can be caused to blink such that a reaction of surprise is expressed, and when the information processing device 100 enters the power save mode, the light emitting portion 145 can be caused to blink such that an image of calm sleep is expressed.

Blinking patterns that cause the light emitting portion 145 to emit light are respectively linked with each of this type of image. In this case also, the blinking patterns are prescribed by the color of the light emitted by the light emitting portion 145, the period of time over which the light is emitted and the timing at which the light is emitted etc.

When the operating state of the information processing device 100 is transmitted from the event notification portion 150 to the analysis portion 143, the analysis portion 143 acquires the blinking pattern prescribed by the images shown in FIG. 12 from the blinking pattern storage portion 146, based on the operating state. Then, the analysis portion 143 transmits the acquired blinking pattern to the blinking control portion 144, and the blinking control portion 144 causes the light emitting portion 145 to blink based on the blinking pattern. In this way, by causing the light emitting portion 145 to emit light based on the blinking pattern corresponding to the operating state of the information processing device 100, the user can be easily notified of the operating state of the information processing device 100.

As an example of changing blinking patterns of the light emitting portion 145 in accordance with the operating state, the light emitting portion 145 blinking pattern when the information processing device 100 is in power save mode is shown in FIG. 13. In a similar way to FIG. 11, FIG. 13 shows a timeline of the blinking of the first light emitting portion 106L and the second light emitting portion 106R. When the information processing device 100 is in power save mode, the light emitting portion 145 is blinked such that it expresses an image of calm sleep. For example, the blinking control portion 144 causes the light emitting portion 145 to extinguish over a predetermined period of time (approximately two seconds, for example) after slowly (in units of approximately one second, for example) causing the color of the light emitted by the light emitting portion 145 to change using relaxing colors, such as white, pale blue and blue etc. The power save mode image can be expressed by repeating the blinking pattern of illumination and extinguishing in line with the changing of the color of the emitted light.

The blinking of the light emitting portion 145 is continued for as long as the power save mode of the information processing device 100 continues, and when the power save mode is released, the light emitting portion 145 blinking according to the current blinking pattern is ended. In this way, the user can be notified by the light emitting portion 145 that the power save mode of the information processing device 100 has been released.

Order of Priority of Notification Information

In the information notification process by the information notification processing portion 140 according to the present embodiment, it is possible that a plurality of input operations detected by the touch sensor 109 or operations of the information processing device 100 that are notified to the user occur simultaneously. In the information processing device 100 according to the present embodiment, to make information easy to recognize, a plurality of notification methods that notify the user of operating states are not provided, but rather various operating states are notified using the light emitting portion 145. Therefore, the light emitting portion 145 only notifies the user of one set of information.

When a plurality of sets of information to be notified to the user occur, to decide the information to be notified by the light emitting portion 145, an order of priority in which information is notified to the user can be established. When a plurality of reactions to input operations and operating states are to be notified to the user, the analysis portion 143 is set such that it notifies the user of the highest priority information, based on the order of priority. In this way, the information in which the user is likely to be most interested can be notified as a matter of priority. The order of priority may be set in advance, or may be set by the user.

The order of priority can be set, for example, as the following order:

(1) Application event; (2) Power source of information processing device 100 switched on/off or adaptor card (AC) insertion/removal event; (3) Operation of touch sensor 109; (4) Opening/closing event; (5) Power save event. Application events include, for example, music playback processing by a music playback application, notification processing of reception of an electronic mail or an incoming call on an IP phone, effective performance processing while playing a game and so on.

Further, when the order of priority of simultaneously occurring events is the same, it is also acceptable that, for example, the newest occurrence, namely, the most recent event, is notified as a matter of priority. By setting the notification of events by the blinking of the light emitting portion 145 based on the order of priority in this way, the user can be notified of desired information.

The structure of the information processing device 100 according to the present embodiment and the information notification method by the information processing device 100 according to the present embodiment are explained above. According to the information processing device 100 of the present embodiment, reactions to input operations to the information processing device 100 and operating states of the information processing device 100 are notified to the user by the light emitting portion 145. By concentrating a notification unit to notify information to the user in an easy to understand single location, namely the light emitting portion 145, in this way, the user can easily recognize the information being notified, and the recognition rate can thus be improved. Moreover, by causing the light emitting portion 145 to blink using the blinking pattern that can suggest the reaction to the input operation or the operating state, the user can be notified of information in an easy to understand way.

It should be understood by those skilled in the art that various modifications, combinations, sub-combinations and alterations may occur depending on design requirements and other factors insofar as they are within the scope of the appended claims or the equivalents thereof.

In the above-described embodiment, touch by an operating body on the touch sensor 109 is detected and the user operation is analyzed, but the present invention is not limited to this example. For example, by increasing the sensitivity of the touch sensor 109, even if the user does not touch the touch sensor 109, the touch sensor 109 can be set such that it detects an approach. In this way, the touch sensor 109 can react to the user being in proximity to the information processing device 100 and can cause the light emitting portion 145 to emit light. Furthermore, for example, in a similar way to a fortune teller passing his or her hand over the top of a crystal ball, by passing a hand over the touch sensor 109, a fortune-telling application can be operated while also causing the light emitting portion 145 to emit light. In addition, whether the user has touched or approached the touch sensor 109 may be detected, and input control may be performed in accordance with the touch or the approach.

Figure 14A:
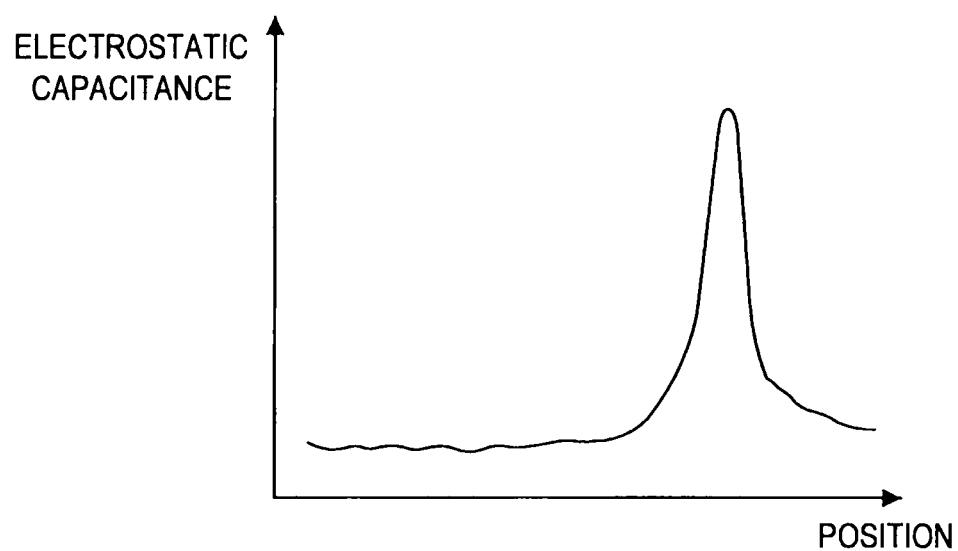
FIG. 14A is an explanatory diagram showing a detection state of the touch sensor when a hand that is the operating body approaches the touch sensor.
Figure 14B:
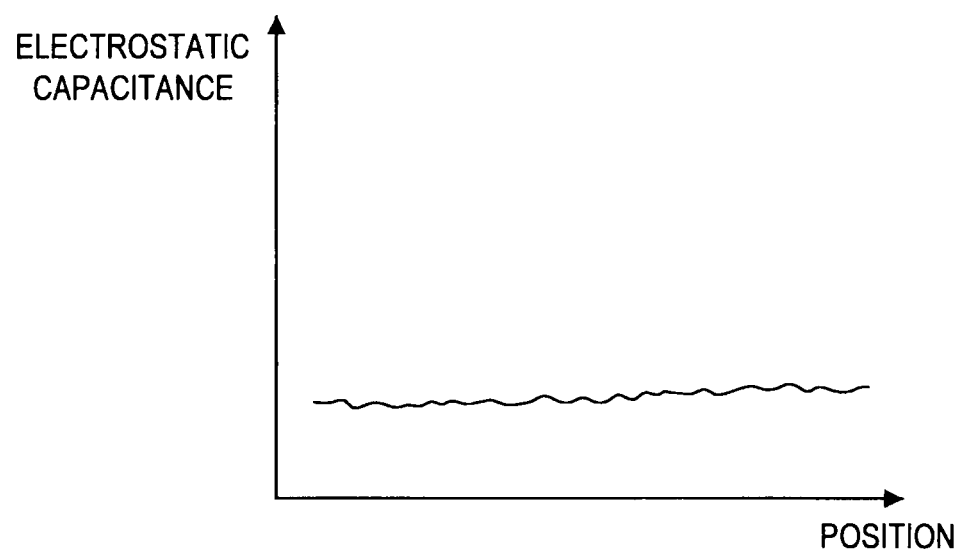
FIG. 14B is an explanatory diagram showing a detection state of external noise by the touch sensor.

In this case, by improving the sensitivity of the touch sensor 109, it is conceivable that the touch sensor 109 can easily detect external noise. However, when a hand approaches the touch sensor 109, the electrostatic capacitance greatly increases, as shown in FIG. 14A, whereas in the case of external noise, a substantially constant and specific degree of external noise is constantly detected, as shown in FIG. 14B. Here, by performing a filter operation and detecting electrostatic capacitance of a certain threshold or more as a signal, even if the sensitivity of the touch sensor 109 is improved, the approach of the user's hand to the touch sensor 109 can be detected without problem, irrespective of external noise.

In addition, in the above-described present embodiment, the operations of touching, continuously touching and stroking etc. are described as examples of operations that can be distinguished by the touch sensor 109. However, the present invention is not limited to these examples. For example, the touch sensor 109 may be designed such that operations such as tapping or picking up can be distinguished.

Furthermore, in the above-described embodiment, the touch sensor 109 is formed of the first touch sensor 109L and the second touch sensor 109R. However, the present invention is not limited to this example. Two or more touch sensors can be provided and movement of the operating body can be detected in more detail by the arrangement of the touch sensors.

In addition, in the above-described embodiment, the touch sensor 109 simply detects input operations by the user, but the touch sensor 109 can, for example, be used as an application operating device. In this case, for example, when the PC executes a music playback application, the music playback application operations to cause playback processing or stop processing etc. can be performed by input operations on the touch sensor 109. Further, the light emitting portion 145 can be caused to blink in accordance with the input operations or operational state. In this way, application operations can be performed even when the PC is closed, and the operational state can be recognized using the light emitting portion 145.

In addition, in the above-described embodiment, the blinking patterns are set in advance, but the present invention is not limited to this example. For example, it is also acceptable that the user can set parameters for the events that the user wishes to associate with the light emitting portion 145 blinking, such as the brightness and the period of time of light emission of the red, blue and green color light components etc.

The present application contains subject matter related to that disclosed in Japanese Priority Patent Application JP 2008-227829 filed in the Japan Patent Office on Sep. 5, 2008, the entire content of which is hereby incorporated by reference.

What is claimed is:

1. An information processing device comprising:
    a detection portion that detects an approach or a touch of an operating body and that is provided on an external surface of a housing having a first housing and a second housing that is openably/closably attached to the first housing, the detection portion being exposed when the second housing is closably attached to the first housing;
    a storage portion that stores detection information detected by the detection portion and a blinking pattern;
    a blinking control portion that controls blinking of a light emitting portion based on the detection information detected by the detection portion and on the blinking pattern; and
    an operation detection portion that detects an operating state of the information processing device, wherein
    the blinking control portion controls blinking of the light emitting portion in accordance with the operating state detected by the operation detection portion,
    when a plurality of detection information is detected by the detection portion or when a plurality of operating states is detected by the operation detection portion, the blinking control portion decides a blinking pattern of the light emitting portion based on an order of priority set in advance, and
    when one of a plurality of detection information and a plurality of operating states having a same order of priority is detected, the blinking control portion causes the light emitting portion to blink using the blinking pattern that is linked to one of a newest detection information and a newest operating state.

2. The information processing device according to claim 1, further comprising:
    an analysis portion that analyzes operation of the operating body from the detection information detected by the detection portion; wherein
    the blinking control portion controls blinking of the light emitting portion based on results of analysis by the analysis portion.

3. The information processing device according to claim 2, wherein
    the storage portion further stores an operation of the operating body that is analyzed by the analysis portion and a blinking pattern,
    the analysis portion acquires the blinking pattern associated with the operation of the operating body analyzed by the analysis portion from the storage portion, and
    the blinking control portion causes the light emitting portion to blink in accordance with the blinking pattern.

4. The information processing device according to claim 1, wherein
    when the operation detection portion detects at least one of that the information processing device is being driven by a battery and that the housing is in a closed state, the blinking control portion stops at least one of detection by the detection portion and light emission by the light emitting portion.

5. The information processing device according to claim 4, wherein
the blinking control portion prohibits light emission by the light emitting portion only when the operation detection portion further detects that the information processing device is in power save mode.

6. The information processing device according to claim 1, wherein
the light emitting portion is positioned in a location in which the light emitting portion can be verified when the housing is in a closed state.

7. The information processing device according to claim 6, wherein
the detection portion and the light emitting portion are provided in different areas.

8. The information processing device according to claim 1, wherein
the detection portion is covered by a shielding member that shields the detection portion from external noise.

9. An information notification method performed by an information processing apparatus, the method comprising:
detecting an approach or a touch of an operating body by a detection portion provided on an external surface of a housing having a first housing and a second housing that is openably/closably attached to the first housing, the detection portion being exposed when the second housing is closably attached to the first housing;
controlling blinking of a light emitting portion based on detection information detected by the detection portion and on a blinking pattern that is linked to the detection information detected by the detection portion and stored in a storage portion; and
detecting an operating state of the information processing apparatus, wherein
the controlling blinking controls blinking of the light emitting portion in accordance with the operating state detected by the operation detection portion,
when a plurality of detection information is detected or when a plurality of operating states is detected, the controlling blinking includes deciding a blinking pattern of the light emitting portion based on an order of priority set in advance, and
when one of a plurality of detection information and a plurality of operating states having a same order of priority is detected, the controlling blinking includes causing the light emitting portion to blink using the blinking pattern that is linked to one of a newest detection information and a newest operating state.

10. A non-transitory computer-readable medium including computer program that causes a computer to function as:
a blinking control unit that controls blinking of a light emitting portion based on detection information detected by a detection portion provided on an external surface of a housing having a first housing and a second housing that is openably/closably attached to the first housing, the detection portion being exposed when the second housing is closably attached to the first housing, and on a blinking pattern that is linked to the detection information detected by the detection portion and stored in a storage portion; and
an operation detection unit that detects an operating state of the computer, wherein
the blinking control unit controls blinking of the light emitting portion in accordance with the operating state detected by the operation detection unit,
when a plurality of detection information is detected by the detection portion or when a plurality of operating states is detected by the operation detection unit, the blinking control unit decides a blinking pattern of the light emitting portion based on an order of priority set in advance, and
when one of a plurality of detection information and a plurality of operating states having a same order of priority is detected, the blinking control unit causes the light emitting portion to blink using the blinking pattern that is linked to one of a newest detection information and a newest operating state.

11. The information processing device according to claim 1, wherein
the first housing includes a display portion on a first surface that is exposed when the second housing is openably attached to the first housing, and
the detection portion is provided on a second surface of the first housing, the second surface of the housing being on a reverse side of the first housing from the first surface.

12. The information processing device according to claim 1, wherein
the light emitting portion is provided on an external surface of the second housing and is exposed when the second housing is closably attached to the first housing.

13. The information processing device according to claim 12, wherein
the detection portion and the light emitting portion are exposed and located in close proximity to one another when the second housing is closably attached to the first housing.

* * * * *